United States Patent [19]

Jinnai et al.

[11] Patent Number: 4,562,442

[45] Date of Patent: Dec. 31, 1985

[54] INK-JET PRINTING APPARATUS

[75] Inventors: Koichiro Jinnai, Kawasaki; Masanori Horike, Tokyo, both of Japan

[73] Assignee: Ricoh Company, Ltd., Japan

[21] Appl. No.: 389,079

[22] Filed: Jun. 16, 1982

[30] Foreign Application Priority Data

Jun. 17, 1981 [JP] Japan ................................ 56-93637

[51] Int. Cl.[4] ............................................ G01D 15/18

[52] U.S. Cl. ............................................ 346/75

[58] Field of Search .............................. 346/75, 140 R

[56] References Cited

U.S. PATENT DOCUMENTS 4,060,813 11/1977 Yamada et al. ........................ 346/75
4,354,195 10/1982 Oomori et al. ........................ 346/75
4,395,717 7/1983 Horike et al. ........................ 346/75
4,426,652 1/1984 Horike et al. ........................ 346/75

*Primary Examiner*—E. A. Goldberg
*Assistant Examiner*—Gerald E. Preston
*Attorney, Agent, or Firm*—Guy W. Shoup

[57] ABSTRACT

The present ink-jet printer is of the type in which ink droplets are charged under control and deflected by passing through an electric field, and it has two modes of operation: deflection error compensation mode and printing mode. In accordance with the present invention, deflection error is first compensated to determine an optimum amplification gain, which is then used in the printing operation, in which interactive effects with other ink droplets are compensated as well.

4 Claims, 11 Drawing Figures

FIG.2

| STEP | $F_3$ | $F_2$ | $F_1$ | VCS | $P_1$ | $P_2$ | $P_3$ | $P_4$ | STEP | $F_3$ | $F_2$ | $F_1$ | VCS | $P_1$ | $P_2$ | $P_3$ | $P_4$ |
|---|---|---|---|---|---|---|---|---|---|---|---|---|---|---|---|---|---|
| 1 | 000 | 000 | 001 | 209 | 01E | 008 | 000 | 000 | 17 | 002 | 004 | 00F | 435 | 00E | 00C | 009 | 007 |
| 2 | 000 | 000 | 002 | 22D | 00A | 008 | 001 | 001 | 18 | 002 | 005 | 00F | 457 | 00F | 00D | 009 | 007 |
| 3 | 000 | 001 | 003 | 251 | 00A | 003 | 001 | 001 | 19 | 002 | 005 | 00F | 478 | 010 | 00D | 009 | 008 |
| 4 | 000 | 001 | 003 | 274 | 00B | 004 | 001 | 001 | 20 | 002 | 005 | 010 | 499 | 010 | 00D | 009 | 009 |
| 5 | 000 | 001 | 004 | 297 | 00B | 004 | 002 | 002 | 21 | 002 | 006 | 010 | 4BA | 011 | 00F | 009 | 009 |
| 6 | 000 | 001 | 005 | 2BA | 00B | 006 | 002 | 002 | 22 | 002 | 006 | 010 | 4DB | 012 | 00F | 009 | 00A |
| 7 | 000 | 001 | 006 | 2DD | 00C | 006 | 003 | 002 | 23 | 002 | 007 | 011 | 4FC | 012 | 00F | 009 | 00A |
| 8 | 001 | 001 | 007 | 300 | 00D | 007 | 003 | 002 | 24 | 003 | 007 | 011 | 51D | 013 | 00F | 009 | 008 |
| 9 | 001 | 002 | 008 | 323 | 00E | 007 | 003 | 002 | 25 | 003 | 007 | 011 | 53D | 015 | 010 | 009 | 00C |
| 10 | 001 | 002 | 009 | 346 | 00E | 008 | 004 | 003 | 26 | 003 | 007 | 011 | 55D | 015 | 011 | 009 | 00C |
| 11 | 001 | 002 | 00A | 369 | 00E | 008 | 004 | 003 | 27 | 004 | 008 | 012 | 57D | 016 | 011 | 00A | 00D |
| 12 | 001 | 002 | 00B | 38B | 00D | 009 | 005 | 003 | 28 | 004 | 008 | 012 | 59C | 016 | 013 | 00B | 00D |
| 13 | 002 | 003 | 00C | 3AD | 00D | 00A | 005 | 004 | 29 | 004 | 008 | 012 | 5BB | 017 | 013 | 00D | 00E |
| 14 | 002 | 003 | 00D | 3CF | 00D | 00B | 006 | 005 | 30 | 000 | 008 | 012 | 5DA | 018 | 013 | 00E | 00E |
| 15 | 002 | 003 | 00E | 3F1 | 00E | 00B | 007 | 005 | 31 | 000 | 7FF | 012 | 5F9 | 019 | 014 | 00F | 00F |
| 16 | 002 | 004 | 00F | 413 | 00E | 00C | 008 | 006 | 32 | 000 | 000 | 001 | 618 | 01A | 014 | 011 | 010 |

INK-JET PRINTING APPARATUS

BACKGROUND OF THE INVENTION

1. Field of the Invention

This invention relates to an ink-jet printer and more in particular to improvements in the charge amount control type ink-jet printing apparatus capable of causing flying ink droplets to land at desired locations on recording paper thereby producing a printed character thereon without distortion.

2. Description of the Prior Art

In the charge amount control type ink-jet printing apparatus, flying ink droplets are charged individually in sequence in accordance with the information as to a character to be printed and the thus charged ink droplets are deflected selectively in a constant electric field formed between a pair of deflection plates to impinge upon recording paper at desired locations, thereby forming a desired imprint thereon. In this case, a local flow is induced in the wake of a flying ink droplet. Thus, when the immediately following ink droplet comes under the influence of such a local flow, its aerodynamic drag force is decreased so that the immediately following ink droplet comes closer to and eventually catches up with the preceding ink droplet to form an integrated ink droplet thereby causing print distortion.

Since all or some of the flying ink droplets are charged, they influence each other electrostatically under the Coulomb's law to cause the spacing between ink droplets irregular, resulting in production of print distortion. Moreover, as influenced by the preceding charged ink droplet, the next following ink droplet just about to be charged will be insufficiently charged. This can also be a cause of the production of print error.

One approach to cope with the above-mentioned problems is disclosed in the U.S. Pat. No. 3,946,399. That is, in accordance with the idea disclosed in the above-mentioned patent, in order to compensate for electrostatic effects between charged ink droplets as well as aerodynamic effects, a character pattern to be printed is detected in advance and the charging amount of an ink droplet is compensated in accordance with the detected charge pattern prior to the printing step. However, such a technique is of little value when the number of deflection steps is increased to about 32. Because, when the number of deflection steps increases, ink droplets are more narrowly spaced from each other when they fly so that the level of print distortion increases. Besides, since the flying time of each ink droplet differs depending upon the amount of deflection, the level of print distortion also varies depending upon the amount of deflection. Therefore, in order to carry out a proper compensation to avoid print distortion, such a compensation must be adjustable for the number of deflection steps.

The ink-jet printer system shown in FIGS. 1 through 3 is so structured that it may carry out a proper compensation to avoid print distortion in accordance with the contents of print data and the number of deflection steps. That is, the ink-jet printer shown in FIG. 1 comprises a clock pulse generator 1 having its output connected to an input of a frequency divider 2. The frequency divider 2 supplies a first frequency output $f_1$ to a phase shifter 3 which supplies its output to an ink-jet discharging head through an amplifier 4. The phase shifter 3 is also connected from a charge phase detecting electrode through an amplifier 5. The output of the clock pulse generator 1 is also connected to the phase shifter 3 and to a check pulse generator 6, which, in turn, is connected to an amplifier 9. A charge compensating circuit 7 is connected to the frequency divider 2 in such a manner to receive second and third frequency outputs $f_2$ and $f_3$. The charge compensating circuit 7 also receives print or character data to be printed and a print command signal and supplies its output to a digital-to-analog (D/A) converter, which, in turn, supplies its analog output to the amplifier 9 connected to a charging electrode for charging each ink droplet to be charged.

In one embodiment of the system shown in FIG. 1, the frequency of a clock pulse signal generated from the clock pulse generator 1 is 1,056 kHz and when such a clock pulse signal is supplied to the frequency divider 2, an exciting pulse signal $f_1$ having the frequency of 132 kHz, a charging pulse signal $f_2$ having the frequency of 44 kHz and a compensating pulse signal $f_3$ having the frequency of 352 kHz are produced. It is to be noted that the exciting pulse signal of 132 kHz is applied to the ink-jet discharging head and two uncharged guard droplets between charged droplets are provided thereby decreasing the level of print distortion. In other words, every three droplets are charged in this embodiment. And thus the frequency of charging ink droplets is 44 kHz. If desired, however, such guard droplets may be eliminated. The charging voltage may be varied in the range between 50 V. and 240 V.

The charge compensating circuit 7 stores a number of compensating amounts in the form of charging codes, and an arithmetic operation of addition or non-addition of compensating amounts to a reference charging value is controlled in accordance with the presence or absence of a print or character data as the stored compensating amounts are read out sequentially. The resulting added quantity is converted into an analog signal by the D/A converter 8 and then applied to the charging electrode after being amplified by the amplifier 9. The compensating amounts are stored in the form of the binary number in a memory such as a read only memory (ROM) or a random access memory (RAM) provided in the charge compensating circuit 7. Together with these compensating amounts, reference charge amounts also in the form of codes, which are so formed to allow respective ink droplets to reach predetermined locations when they are deflected one by one as individual droplets, are also stored in the memory.

FIG. 2 shows the compensating and reference charge amounts expressed in the form of predetermined codes in a tabulated form. It is to be noted that each code in the table shown in FIG. 2 is, in reality, comprised of 11 bits; however, in the table shown, each code of 11 bits is represented as a three digit code by converting the first three bits into an octal number and the second four bits and the remaining four bits into hexadecimal numbers. Accordingly, the memory should have an 11-bit parallel structure and the capacity of the bit number determined by 11(bits)×8(dots)×32(steps) or more. Incidentally, the code "7FF" at step 32 in column $F_2$ is to add a complement so as to carry out the arithmetic operation of adding the negative number $-1$. As may be noticed, the reference charge codes in column $V_{cs}$ are non-linear since the aerodynamic drag force varies depending upon the amount of deflection. The compensating amounts are determined on the basis of individual ink droplets; however, in determining the reference charge amounts and compensating amounts, their tentative values are first obtained by a computer simulation and then these tentative values are modified by empirical data. In the embodiment shown in FIG. 2, there are 32 deflection steps and a compensation may be carried out for the four preceding or leading droplets $P_1$ through $P_4$ and the three following or trailing droplets $F_1$ through $F_3$ for a particular droplet $V_{cs}$. In other words, for a particular droplet, the effects due to the preceding four and following three droplets may be compensated by adding the corresponding compensating amounts to the reference amount $V_{cs}$.

FIGS. 3*a* and 3*b* taken together as indicated in FIG. 3 show the detailed structure of the charge compensating circuit 7 which includes an address counter 11 which receives a print command signal and a compensating clock pulse and supplies its output to a memory 12 such as a ROM. The output from the memory 12 is supplied to an adder 14 through a gate 13. The circuit 7 also includes a shift register 15 which receives a charging pulse signal and character data and supplies its output to a multiplexer 16 which also receives an input from the address counter 11. The output of the multiplexer 16 is connected to an input of the gate 13. Also provided are a latch 17, a D/Q flipflop 18 and a gate 19 as connected as shown.

In operation, when the print command signal goes high, the address counter 11 becomes operative and starts counting operation in association with the compensating pulse signal $f_3$. As is obvious, since the compensating pulse signal $f_3$ has the frequency eight times higher than that of the charging pulse signal $f_2$, eight data for a particular deflection step arranged in a row in the table shown in FIG. 2 are read out for each cycle of the charging pulse signal. Print or character data, comprised of a series of the binary numbers with "1" indicating the presence of a print dot or picture element and "0" indicating the absence of a print dot, is shifted into the shift register 15. The output supplied from the shift register 15 is an eight bit parallel output comprised of $O_0$–$O_7$, in which $O_3$ corresponds to the reference charging data to be printed with $O_0$, $O_1$ and $O_2$ carrying information as to the presence or absence of a print dot for the following three ink droplets, which corresponds to $F_3$, $F_2$ and $F_1$, respectively, in the table of FIG. 2, and $O_4$ through $O_7$ carrying information for the preceding ink droplets and corresponding to $P_1$ through $P_4$, respectively, in the table.

The lower three bits of the output from the address counter 11 are introduced into the multiplexer 16. When these lower three bits are all "0", the multiplexer 16 allows to supply the contents of $O_0$ as its output; whereas, when the lower three bits are all "1", the contents of $O_1$ are supplied as an output. In other words, seven data in front and rear of the print data, or eight data in total are selectively supplied as an output one by one depending upon the contents of the lower three bits of an output from the address counter 11.

An output from the multiplexer 16 is applied to the gate circuit 13 which controls the supply of an output from the memory 12. That is, when an output from the multiplexer 16 is high thereby indicating "compensation required", the output from the memory 12 is supplied to the adder 14 through the gate circuit 13 to be added as a compensating amount. An output from the adder 14 is then latched into the latch circuit 17 and then added accumulatively to the following compensating amount when it is supplied to the adder 14. However, when the contents of the lower three bits of an output from the address counter 11 are "7", the input to the latch 17 is inhibited thereby resetting the contents of the latch 17 to "0."

An output from the adder 14 is also supplied to the D/Q flipflop 18 and sampling is carried out at the rising edge of a charging pulse. In this manner, the compensated charging value is now stored in the D/Q flipflop 18 and its fate is controlled by the presence or absence of print data. That is, when the present print data is indicated, the compensated value now stored in the flipflop 18 is supplied through the gate circuit 19 to the D/A converter 8 as a charging code thereby allowing to carry out a required compensation.

As described above, in the ink-jet printer system shown in FIGS. 1 through 3, it is true that a compensation for the interaction with the other ink droplets, in particular charged droplets, to avoid print distortion may be carried out. However, such a compensation alone is not always sufficient in the ink-jet printing technology. That is, even for a particular deflection step, there could be a deflection error due to disturbances in reference conditions other than interaction with the other droplets such as temperature and moisture. If temperature changes to vary the viscosity of the ink, then such a change can cause a deflection error even under the circumstances where no other ink droplets are present. Thus, in order to carry out a total compensation, such a deflection error must be corrected as well as a compensation for the interactive effects with the other droplets.

However, if both of deflection error and interactive error compensations were to be carried out digitally, it would require a large capacity memory and, moreover, there would be a significant delay in calculating the required compensating values. As a result, real-time processing cannot be carried out and the overall structure tends to be complicated, which are disadvantageous.

Stated more in detail, in the charge amount control type ink-jet printer as described above, nth step deflection in reference conditions is given by applying a charging voltage $V_{cn}'$, which takes into account interactive effects with other droplets, to the charging electrode as expressed in the following equation.

$$V_{cn}' = \Sigma P_{n-k} \cdot V_{cs(n-k)} \cdot C_{n-k} + V_{csn} + \Sigma F_{n+k} \cdot V_{cs(n+k)} C_{n+k} \quad (1)$$

where, $P_{n-k}$: distortion rate of the preceding droplet; $F_{n+k}$: distortion rate of the following droplet; $V_{cs(n\pm k)}$: reference code of (n±k)th step single droplet; and $C_{n\pm k}$: presence or absence of (n±k)th step droplet.

On the other hand, in detecting and controlling the amount of deflection of an ink droplet, use is made of, for example, a 32nd step single droplet, which is deflected to carry out the required detection and control. In this case, assuming that the current charging voltage code is $V_{xd}$, the nth step charging voltage $V_{cn}$ will be obtained as shown by the following equation.

$$V_{cn} = V_{cn}'\left(1 + \frac{V_{xd} - V_{cs32}}{V_{cs32}}\right). \quad (2)$$

When a compensation is to be carried out in accordance with the above equation (2), the value of $V_{xd}$ is first determined by increasing or decreasing the value of the charging voltage code in response to an output from the deflecion amount detecting mechanism, and, then, upon completion of detection and control of the amount of deflection, an arithmetic operation is carried out for the factor $$\left(1 + \frac{V_{xd} - V_{cs32}}{V_{cs32}}\right),$$

thereby determining the compensation rate. Then, upon initiation of printing operation, the amount of distortion compensation expressed by the above equation (1) is calculated and it is multiplied by the above-obtained compensation rate. It will thus be understood that a high speed adder is required in the above described system.

SUMMARY OF THE INVENTION

A general object of the present invention is to provide an improved ink-jet printer.

Another object of the present invention is to provide a charge-amount-control type ink-jet printer capable of printing characters on a recording medium without distortion.

A further object of the present invention is to provide a charge-amount-control type ink-jet printer which can compensate deflection error as well as interactive effects with other ink droplets.

A still further object of the present invention is to provide a charge-amount-control type ink-jet printer which is faster in operation and simple in structure.

These and other objects of the invention are attained in accordance with one aspect of the invention by an ink-jet printing apparatus of the type in which ink droplets are charged under control to be desirably deflected when passing through a defined region where an electric field is formed, said printing apparatus comprising: means for emitting ink droplets towards said electric field region; charging means disposed between said emitting means and said electric field region for charging said ink droplets; a central processing unit (CPU) for controlling the overall operation of said printing apparatus; a charge signal generator connected between said CPU and said charging means, said charge signal generator being operative in either a deflection error compensation mode or a printing mode whereby said deflection error compensation mode is first operated to determine an amplifier gain for supplying the charge signal to be applied to said charging means and then the printing operation is carried out using the thus determined amplifier gain as character data are supplied thereto; deflection detecting means connected to supply information as to the amount of deflection of the ink droplets after passing through said electric field region to said CPU; and adjusting means connected between said CPU and said charge signal generator for adjusting the value of said amplifier gain in response to the information supplied from said deflection detecting means.

Other objects, advantages and novel features of the present invention will become apparent from the following detailed description of the invention when considered in conjunction with the accompanying drawings.

BRIEF DESCRIPTION OF THE DRAWINGS

FIG. 2 is a table showing reference charge codes $V_{cs}$ and compensating charge codes $P_1$ through $P_4$ and $F_1$ through $F_3$ which are to be used for compensating interactive effects with preceding and following droplets;

FIGS. 3(*a*) and 3(*b*) taken together show a block diagram showing the detailed structure of one example of the charge compensating circuit 7 shown in FIG. 1;

DESCRIPTION OF THE PREFERRED EMBODIMENTS

Figure 4:
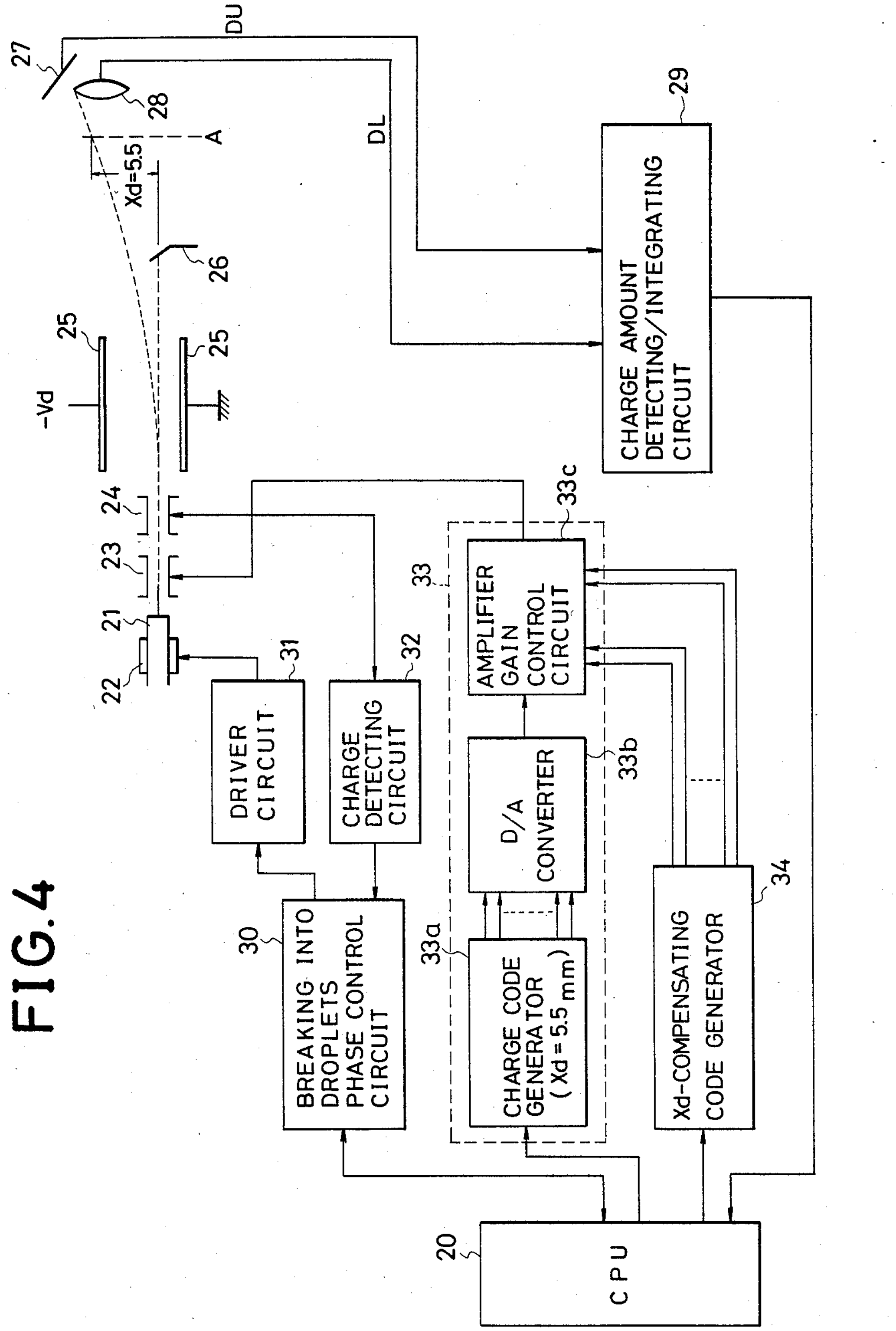
FIG. 4 is a schematic illustration partly in blocks showing one embodiment of the present invention.

FIG. 4 is a schematic illustration showing partly in blocks the ink-jet printing apparatus embodying the present invention. As shown, the present apparatus is provided with a central processing unit (CPU) 20 which carries out the overall control of the present ink-jet system. There is also provided an ink-jet discharging head 21 on which is mounted a piezo-electric vibrator 22. Thus, a stream of ink is discharged in the form of a jet out of the head 21 and vibration is imparted to the ink to break the ink stream into droplets.

In the downstream of the head 21 are disposed a charging electrode 23, a charge detecting electrode 24, and a pair of opposite deflection electrodes 25, one of which is applied with a negative voltage $-V_d$ with the other grounded. Further downstream is provided a gutter 26 for collecting uncharged or non-deflected ink droplets. Printing location A is indicated by the dotted line where recording paper is to be located for printing a desired character thereon. To the right of the printing location A in FIG. 4 for a viewer are provided an upper deflection amount detecting electrode 27 and a lower deflection amount detecting electrode 28, which is located generally below the upper deflection amount detecting electrode 27. Both of the electrodes 27 and 28 are connected to a charge amount ($Q_j$) detecting/integrating circuit 29, which is also connected to the CPU 20.

Connected from the CPU 20 is a breaking-into-droplets phase control circuit 30 which is connected to a driver circuit 31 thereby controlling the phase of an exciting driver signal to be applied to the vibrator 22. A charge detecting circuit 32 is provided as connected between the phase control circuit 30 and the charge detecting electrode 24. Connected between the CPU 20 and the charging electrode 23 is a charging signal generator 33 which includes a charging code generator 33*a*, a digital-to-analog (D/A) converter 33*b* and an amplifier gain control circuit 33c. There is also provided an Xd-compensating code generator 34 which receives an input from the CPU 20 and supplies its output in the form of a gain code α to the amplifier gain control circuit 33c. Xd is a predetermined value such as a maximum deflection value.

Figure 1:
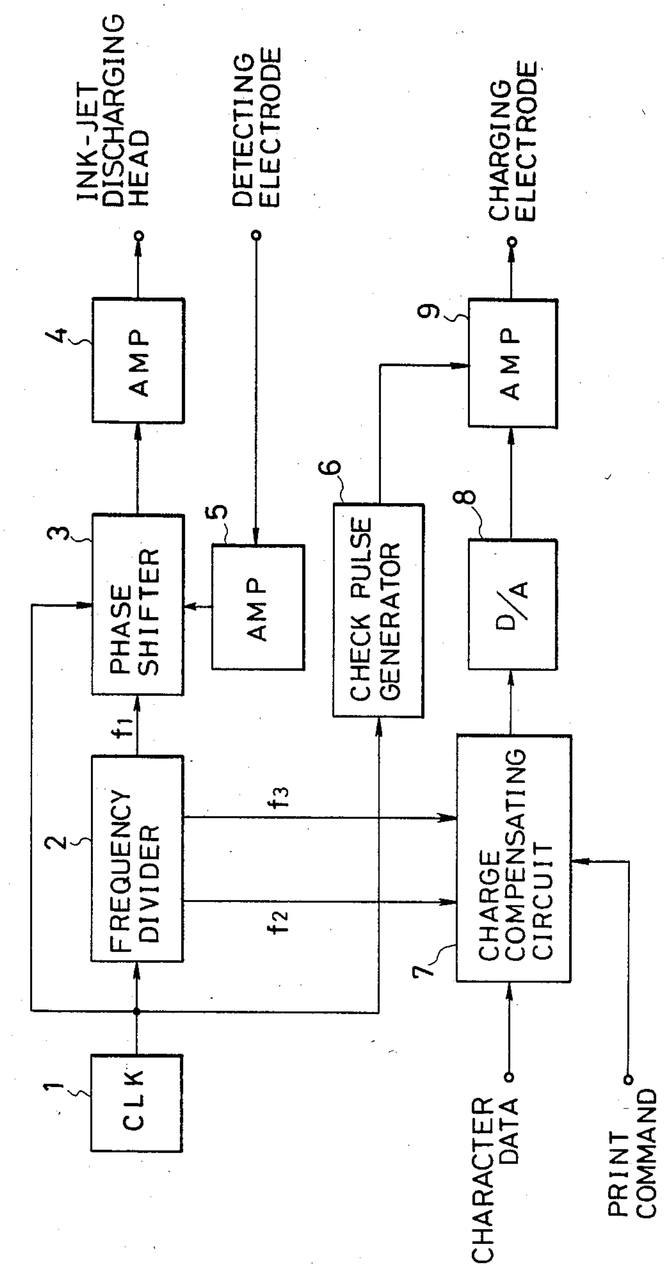
FIG. 1 is a block diagram of an ink-jet printer capable of compensating interactive effects with other ink droplets.

It should be noted that the charge code generator 33a of the present invention basically corresponds in structure and function to the charge compensating circuit 7 shown in FIG. 1. That is, the charge code generator 33a also includes a memory storing the data shown in FIG. 2 and thus when it receives character data from outside, it can carry out a compensation for interactive effects with other droplets. More importantly, however, the charge code generator 33a has an additional function of supplying a predetermined reference charge code (H618 corresponding to Xd=5.5 mm in the embodiment shown in FIG. 4) as an input to the D/A converter 33b when a deflection error compensation is to be carried out prior to the initiation of printing operation. In other words, during the deflection error compensation mode, the output of the charge code generator 33a is fixed to a predetermined reference charge code, i.e., H618 in this embodiment.

Also during the deflection error compensation mode, the Xd-compensating code generator 34 supplies to the amplifier gain control circuit 33c a gain code, the magnitude of which is varied as caluculated in the algorithm stored in the CPU 20 in response to a signal from the charge amount detecting/integrating circuit 29. That is, when the CPU 20 supplies a command signal to initiate the deflection error compensation operation, the charge code generator 33a is clamped to supply a predetermined reference charge code; on the other hand, the Xd-compensating code generator 34 first supplies as its output a predetermined initial gain code $\alpha_o$, and, then, the value of the gain code α is progressively changed in accordance with the information supplied from the feed-back system including the detecting electrodes 27, 28 and the charge amount detecting/integrating circuit 29. At the end of the deflection error compensation mode, or when a desired deflection is obtained under the current use conditions, the thus obtained gain code is fixed and the printing operation is carried out using the gain code thus determined. It is preferable to carry out such a deflection error compensation periodically, for example, each time after printing a predetermined number of lines because the conditions associated with deflection error may change rather quickly.

As explained above, during the deflection error compensation mode, the charge code generator 33a is set to supply a predetermined reference code H618 corresponding to Xd=5.5 mm as an input to the D/A converter 33b; on the other hand, the Xd-compensating code generator 34 is controlled by the CPU 20 such that the gain code α to be supplied to the amplifier gain control circuit 33c is to be increased in value if an output is supplied from the lower detecting electrode 28 or the gain code α is to be lowered in value if an output is supplied from the upper detecting electrode 27, thereby eventually arriving at an optimum gain code $\alpha_{Xd}$. As a result, an analog output $V_{da}$ obtained from the D/A converter 33b comes to be amplified by the thus compensated gain code $\alpha_{Xd}$. Accordingly, taking a predetermined initial gain code $\alpha_o$, the deflection-compensated charging potential $V_n$ can be expressed as in the following manner.

$$V_n = (V_{da})_n \cdot \alpha_o \cdot \left(1 + \frac{\alpha_{Xd} - \alpha_o}{\alpha_o}\right)$$

As described above, in accordance with the present invention, since the distortion compensated charging code is amplified after D/A conversion by a gain code determined by the mechanism of detecting and controlling the amount of deflection, a real-time compensation may be carried out without requiring a large capacity memory.

Figure 5:
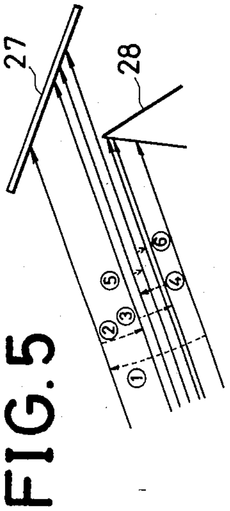
FIG. 5 illustrates how the deflection error compensation is carried out progressively.

FIG. 5 schematically illustrates how the deflection compensation is carried out. When the present apparatus is in the deflection error compensation mode, a carriage (not shown) mounted thereon the ink-jet discharging head 21 is located at the home position defined opposite to the deflecting amount detecting electrodes 27 and 28, or at one end of the reciprocating range of the carriage. Under the condition, in the charging signal generating circuit 33, a predetermined reference charging code, e.g., a code giving Xd=5.5 mm at the printing location A under reference conditions, is supplied as an input to the D/A converter 33b, thereby selectively charging droplets with a predetermined number of guard droplets inbetween to cause the charged ink droplets deflected. The thus deflected droplets are received by the detecting electrode 27 or 28 and the gain of the amplifier 33c is maintained at constant over a predetermined time period thereby allowing to convert the integrated value into the binary number using a predetermined threshold level defined in the circuit 29.

Figure 6:
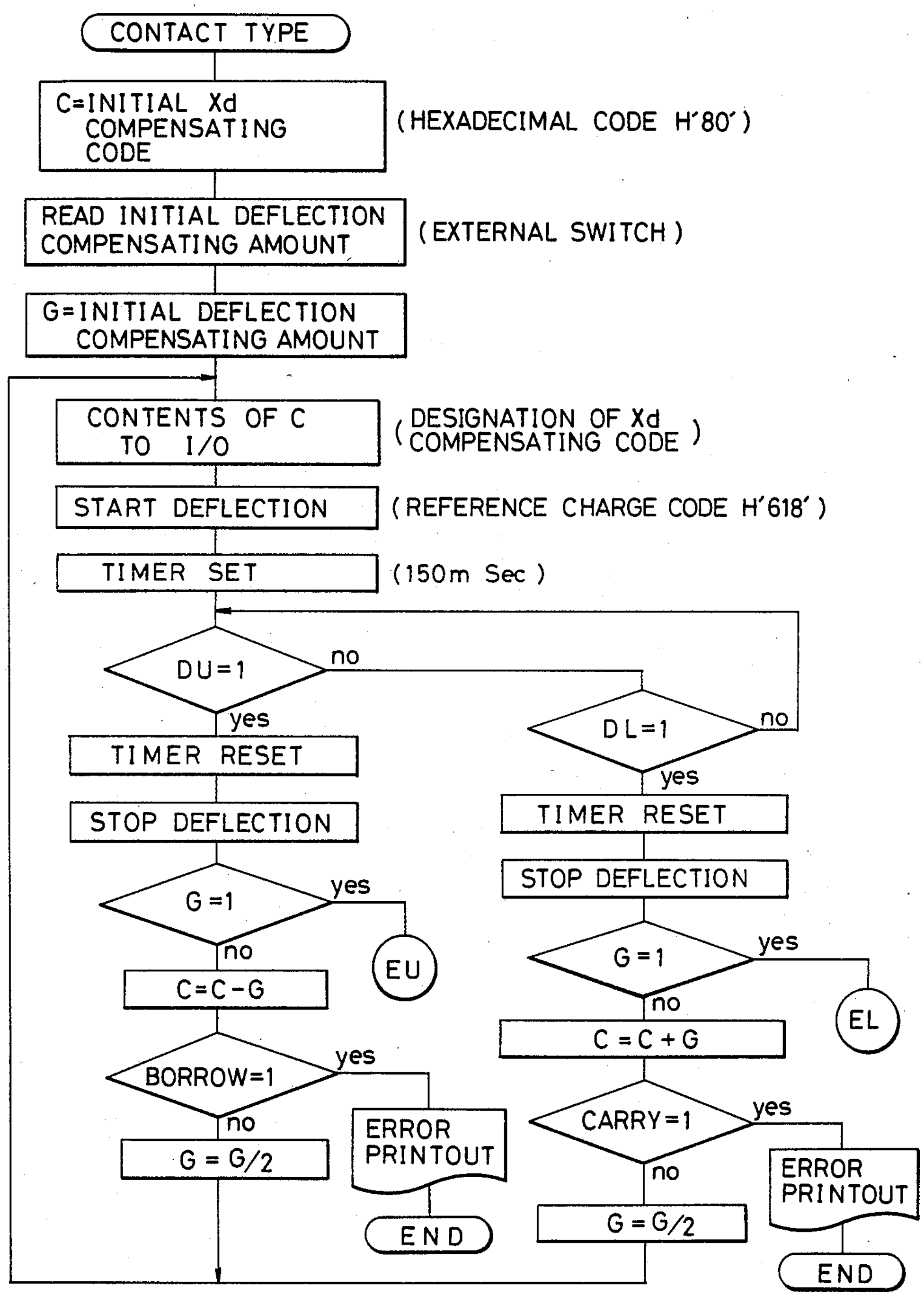
FIGS. 6(*a*) through 6(*c*) in combination forms a flow chart showing the detailed sequence of operation of the deflection error compensation operation.
Figure 6B:
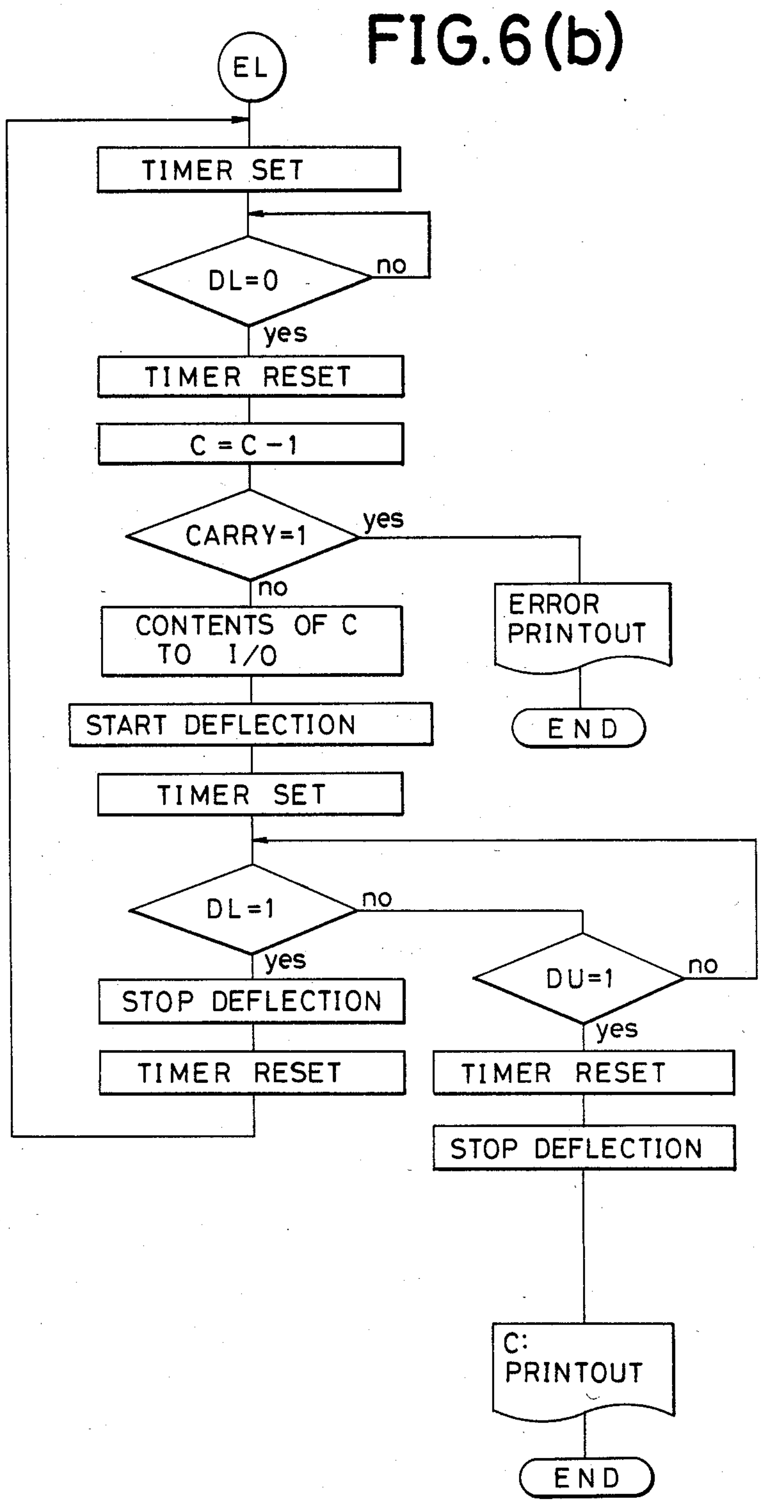
Figure 6:
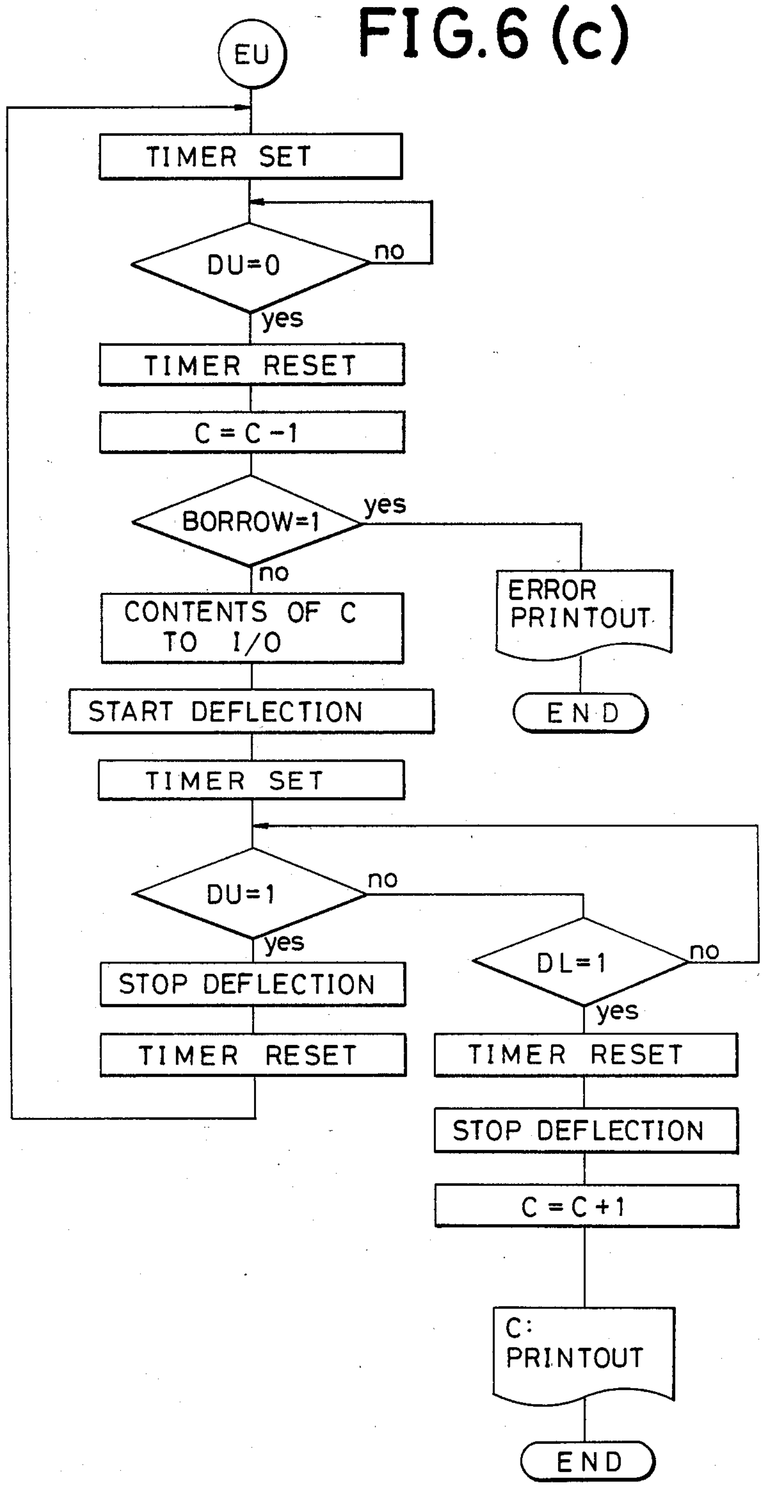

When the amount of deflection is less than 5.5 mm so that the circuit 29 receives a signal DL from the lower detecting electrode 28, the Xd-compensating code generator 34 is so controlled by the CPU 20 that the amplifier gain control circuit 33c is adjusted to increase the gain of the amplifier and holds its increased gain over a predetermined period of time. On the other hand, when the amount of deflection is beyond 5.5 mm and thus the circuit 29 receives a signal DU from the upper detecting electrode 27, a compensation is carried out to decrease the gain of the amplifier. Then, the next charging and deflecting operation is carried out to obtain another output signal from the Qj-detecting/integrating circuit 29. In this manner, the above described operation is repetitively carried out, and, as shown in FIG. 5, the initial compensating amount ①, which is a design value designated by a code, is reduced into half each time and the amount of variation in increase or decrease of the gain is decreased into half each time, thereby when switching between signals DL and DU occurs with a desired minimum amount of variation, which is also a design value, the detecting operation for compensation is completed and the gain code is fixed to the current value, followed by a printing operation. FIGS. 6(a) through (c) taken together show a flow chart showing the above-described process in detail.

Figure 7:
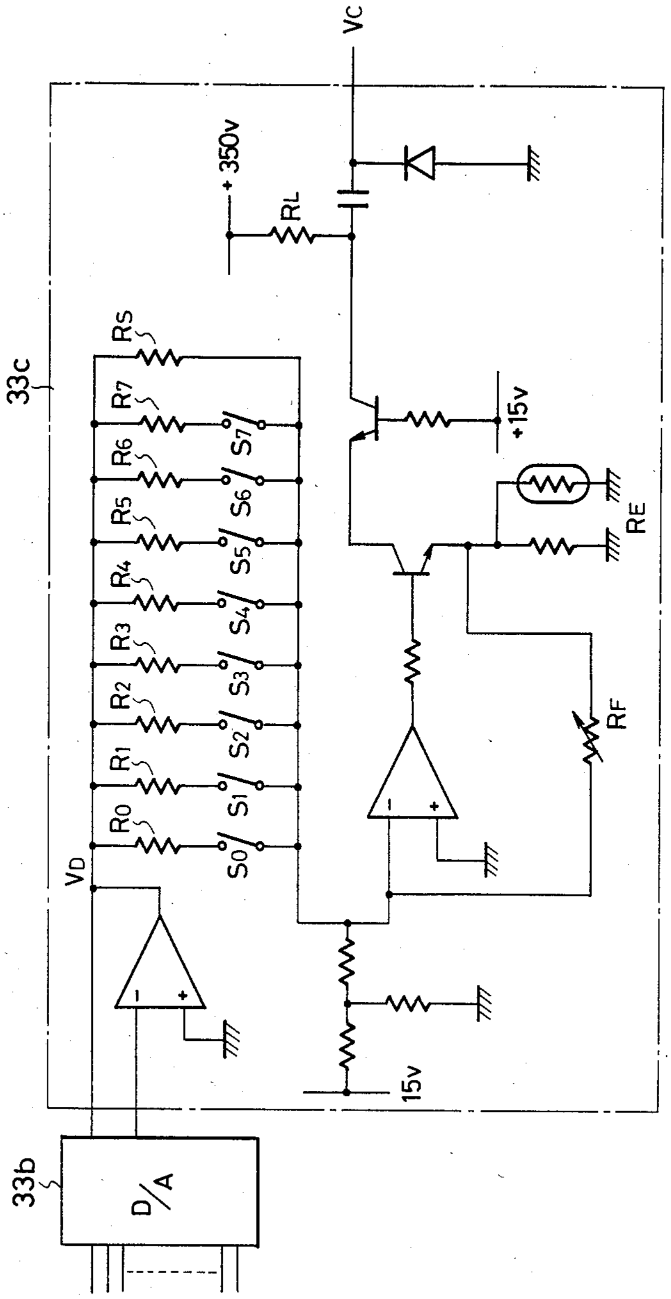
FIG. 7 is a circuit diagram showing the detailed structure of one embodiment of the amplifier gain control circuit shown in FIG. 4.

FIG. 7 shows one example of the amplifier gain control circuit 33c, in which amplifier input impedances $R_0$ through $R_7$ are selectively used by the switches which are operated by the code supplied from the Xd-compensating code generator 34 to control the level of a charging signal. In this example, the detecting accuracy can be held ±30 μm or smaller. Thus, in order to attain the detecting accuracy of ±30/5,500=±0.54% with the maximum amount of deflection of 5.5 mm, the gain control minimum resolving power in varying the level of a charging signal is designed to be about 0.2%. In the structure shown in FIG. 7, taking the output from the D/A converter 33b as $V_D$, then the level of the charging signal $V_C$ may be given by the following equation.

$$V_C = \frac{\left(\frac{V_D}{R_0} + \frac{V_D}{R_1} + \ldots + \frac{V_D}{R_7} + \frac{V_D}{R_S}\right) R_F}{R_E} \cdot R_L$$

Thus, by controlling the analog switches $S_0$ through $S_7$, a controlled value of 0.2 to 25.6% may be obtained.

In the embodiment described above, use is made of a pair of detecting electrodes 27 and 28. It should however be noted that the present invention is not so limited and a single detecting electrode system may be equally applied by eliminating one of the two detecting electrodes. In this case, the absence of a signal over a predetermined period of time from the remaining electrode may be substituted for a signal from the eliminated electrode in a two-electrode system.

As described above, in accordance with the present invention, since the compensation for interactive effects with other droplets is carried out in digital quantity, and the compensation for deflection error is carried out by using a simple separate algorithm, the overall circuit structure is quite simplified and the operation may be carried out on a real time basis.

As may be appreciated, since print distortion becomes more noticeable as the amount of deflection increases and/or the pitch in deflection steps becomes smaller, so that the larger the amount of deflection and/or the smaller the pitch in deflection steps, the larger the number of ink droplets to be compensated. For example, in printing a 12 point character, when the character matrix is formed by 24×24 dots, compensation is required for the presence or absence of the three leading and two trailing droplets; on the other hand, when the character matrix is formed by 32×32 dots with keeping the remaining conditions unchanged, compensation is required for the presence or absence of the four leading and three trailing droplets and more since the deflecting pitch becomes smaller. Thus, as the amount of deflection increases and/or the pitch in deflection steps becomes smaller, a larger capacity memory is usually required.

Moreover, in the above-described ink-jet printer system, the preceding four droplets and following three droplets are compensated, but no compensation is effected for the fifth preceding droplet $P_5$. Thus a slight distortion will occur for the fifth preceding droplet $P_5$. Furthermore, the first droplet $P_F$ of a stream of charged droplets will receive a repulsive force as an interaction with the likely charged following droplets and therefore the first droplet $P_F$ will be shifted somewhat downwardly even if compensation is carried out therefor.

Figure 3:
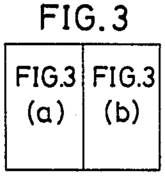
FIG. 3 shows how FIGS. 3(*a*) and 3(*b*) should be combined.
Figure 3:
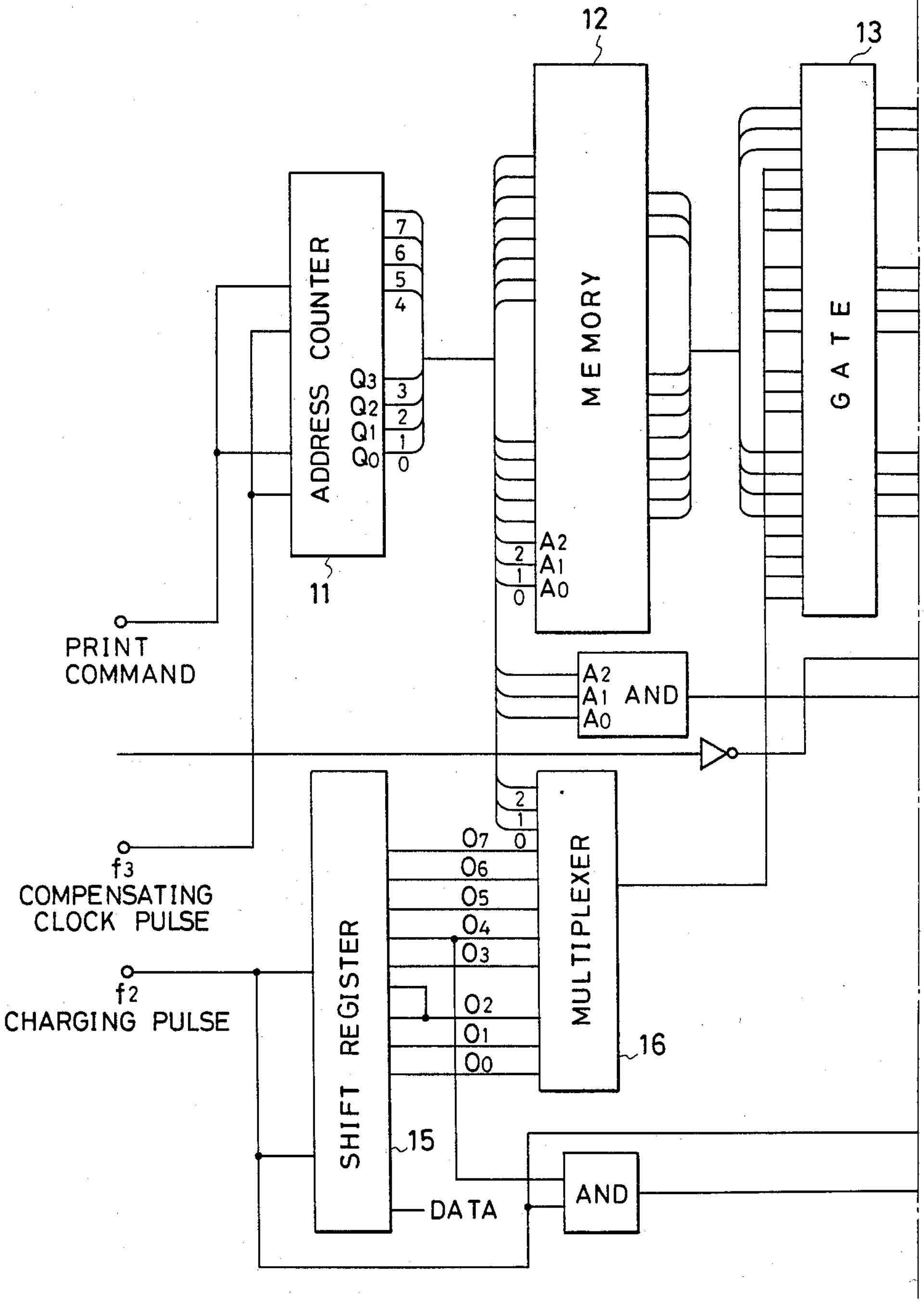
Figure 3B:
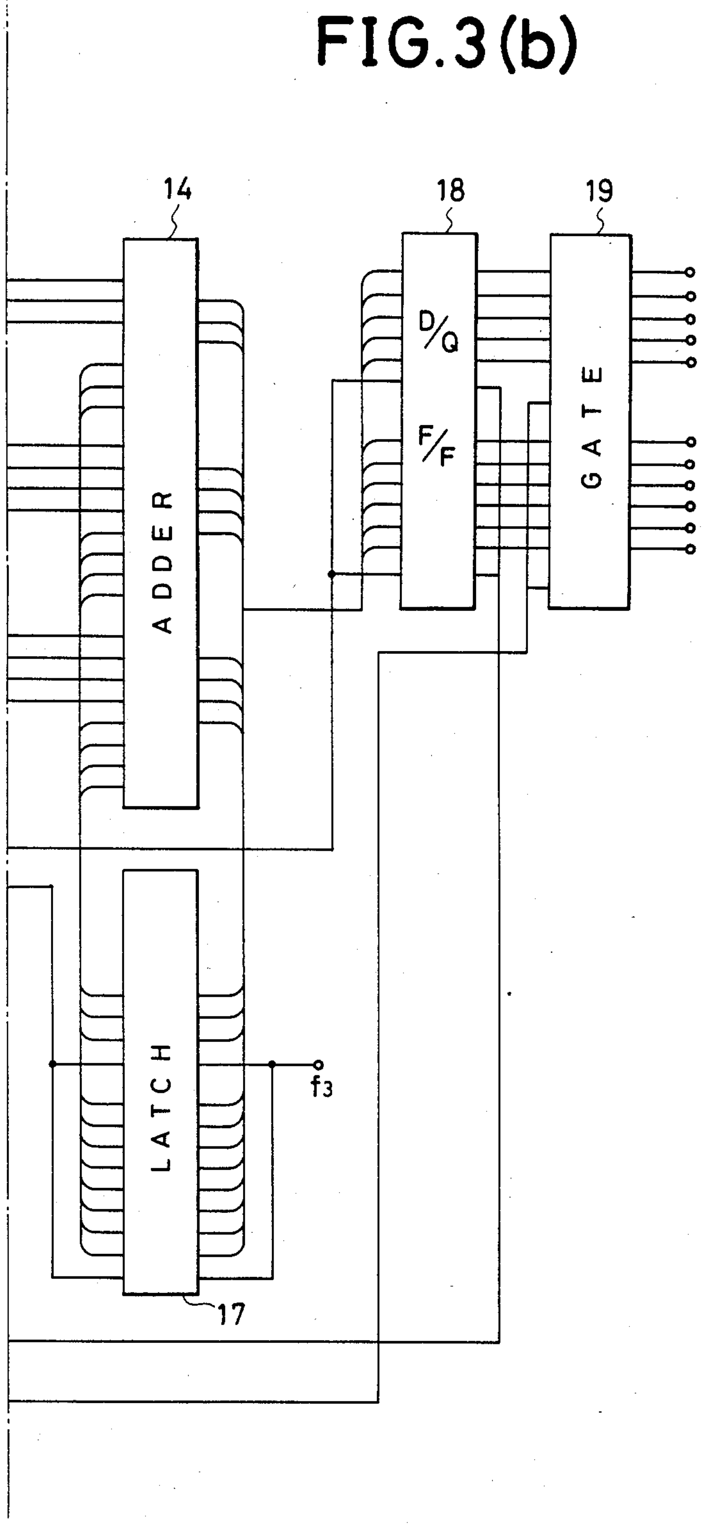
Figure 8:
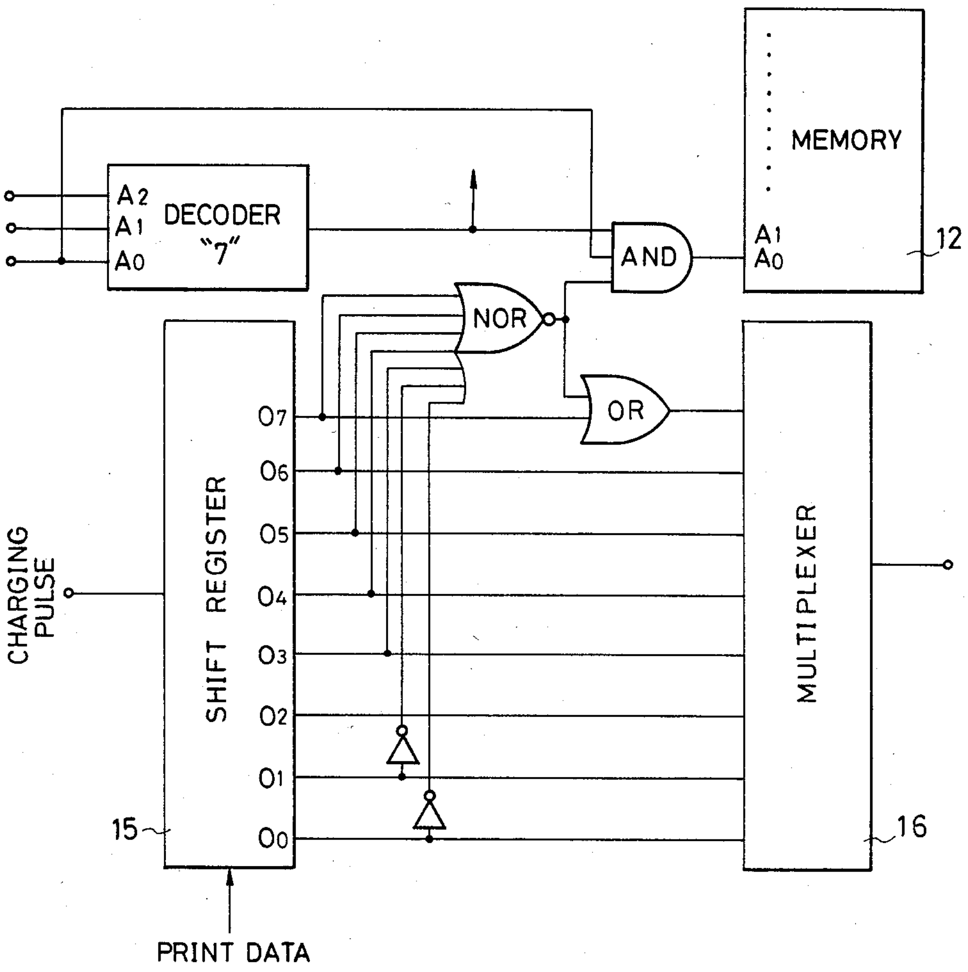
FIG. 8 is a circuit diagram partly in blocks and partly in logics showing one example of increasing the number of ink droplets to be compensated without requiring a large capacity memory.

The structure shown in FIG. 8 is directed to obviate the above-mentioned problems and proposes to carry out compensation for the first droplet or the fifth preceding droplet without requiring an increase in the capacity of a memory. The structure shown in FIG. 8 is a modification in the connection between the shift register 15 and the multiplexer 16 shown in FIGS. 3(*a*) and 3(*b*).

As shown in FIG. 8, when the first ink droplet $P_F$ is coming out of the ink-jet discharging nozzle, the NOR circuit supplies "1" as an output and thus the AND condition for the AND circuit is satisfied, so that the contents of the bottom bit $A_0$ of the AND counter are supplied to the memory 12 thereby the contents of the first droplet are added and thus a compensation takes place. On the other hand, if there is a fifth preceding droplet, the shift register 15 supplies "1" as an $O_7$ output and the NOR circuit supplies "0" as its output, so that the AND condition is not satisfied thereby the contents of the address $A_0$ of the memory 12 becomes "0", in which case the contents of $P_{4,5}$, which is a data common to the fourth and fifth droplets, are read out for addition to carry out the required compensation.

As described above, in accordance with the structure shown in FIG. 8, the contents of $P_{4,5}$ are added or not added for compensation depending upon the presence or absence of the fourth and fifth droplets. In this manner, even if a data is commonly used for the fourth and fifth preceding droplets, the level of distortion in printing may be limited to a small value which cannot be readily appreciated by human eyes, and, therefore, the printing quality may be improved without increasing memory capacity. Alternatively, the compensating data may be arranged in the order of $F_2$, $F_1$, $V_{cs}$, $P_1$, $P_2$, $P_{3,4}$, $P_{5,6}$ and $P_F$, in which case the following two and preceding six droplets may be taken into account without requiring an increase in memory capacity. In this case, the data $P_{3,4}$ is commonly used for the third and fourth preceding droplets; the data $P_{5,6}$ is commonly used for the fifth and sixth preceding droplets. It should be noted in this case however that the address counter must be counted up with the frequency which is nine times larger than that of the charging pulse signal.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink-jet printing apparatus of the type in which ink droplets are charged under control to be desirably deflected when passing through a defined region where an electric field is formed, said printing apparatus comprising:

means for emitting ink droplets towards said electric field region;

charging means disposed between said emitting means and said electric field region for charging said ink droplets;

a central processing unit (CPU) for controlling the overall operation of said printing apparatus;

a charge signal generator connected between said CPU and said charging means, said charge signal generator including a charge code generator for supplying a charge code in response to a signal from said CPU, a digital-to-analog (D/A) converter which receives said charge code and converts it into an analog charge signal and an amplifier gain control circuit for amplifying said analog charge signal to apply an amplified charge signal to said charging means and said charge code generator and said amplifier gain control circuit being operative in either a deflection error compensation mode or a printing mode whereby said deflection error compensation mode, in which said charge code generator supplies a predetermined reference charge code, is first operated to determine an amplifier gain of said amplifier gain control circuit and then the printing operation is carried out using the thus determined amplifier gain as character data are supplied thereto;

deflection detecting means connected to supply information as to the amount of deflection of the ink droplets after passing through said electric field region to said CPU; and adjusting means connected to said CPU and said amplifier gain control circuit of said charge signal generator for adjusting the value of said amplifier gain in response to the information supplied from said deflection detecting means during said deflection error compensation mode.

2. The ink-jet printing apparatus of claim 1 wherein said amplifier gain control circuit includes an amplifier which supplies as its output said amplified charge signal to said charging means and input impedance control means connected to the input of said amplifier to receive the analog charge signal from said D/A converter.

3. The ink-jet printing apparatus of claim 2 wherein said adjusting means supplies a gain code comprised of a predetermined number of bits and said input impedance control means includes the corresponding number of resistors connected in parallel with each connected in series to an individual switch, whereby said switches are controlled by the corresponding bits of said gain code.

4. The ink-jet printing apparatus of claim 3 wherein when said charge signal generator is in the deflection error compensation mode, said charge code generator supplies only a predetermined reference charge code; whereas, said adjusting means varies the gain code until a desired deflection of ink droplets is obtained.

* * * * *